(12) United States Patent
Norton (10) Patent No.: US 8,533,930 B2
(45) Date of Patent: Sep. 17, 2013

(54) MANUAL ROBOTIC TOOL CHANGER HAVING RAPID COUPLING MECHANISM

(75) Inventor: Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 673 days.

(21) Appl. No.: 12/687,766

(22) Filed: Jan. 14, 2010

(65) Prior Publication Data

US 2010/0113236 A1    May 6, 2010

Related U.S. Application Data

(63) Continuation-in-part of application No. 12/205,216, filed on Sep. 5, 2008.

(51) Int. Cl.
*B23B 31/22* (2006.01)

(52) U.S. Cl.
USPC .......... 29/525; 279/2.19; 279/2.23; 279/2.12; 279/69; 403/322.2

(58) Field of Classification Search
USPC ............. 279/2.1, 2.11, 2.12, 2.19, 2.23, 69; 403/322.2
IPC .......................................... B23B 31/22, 31/107
See application file for complete search history.

(56) References Cited

U.S. PATENT DOCUMENTS

| | | | | |
|---|---|---|---|---|
| 2,968,205 A | * | 1/1961 | Springate | 411/348 |
| 3,214,195 A | * | 10/1965 | Zahuranec et al. | 285/27 |
| 3,225,617 A | * | 12/1965 | Young | 477/43 |
| 4,568,110 A | * | 2/1986 | Momberg | 285/26 |
| 4,680,999 A | * | 7/1987 | Kojima et al. | 82/160 |
| 4,723,877 A | * | 2/1988 | Erickson | 409/234 |
| 4,726,268 A | * | 2/1988 | Erickson | 82/160 |
| 4,726,269 A | * | 2/1988 | Erickson | 82/160 |
| 4,736,659 A | * | 4/1988 | Erickson | 82/160 |
| 4,747,735 A | * | 5/1988 | Erickson et al. | 409/234 |
| 4,863,323 A | * | 9/1989 | Glaser | 409/232 |

(Continued)

FOREIGN PATENT DOCUMENTS

DE        3706946 A1  *  9/1988

OTHER PUBLICATIONS

Maier et al.; Changing Flange Unit for a Handling Device; Sep. 15, 1988; EPO English Machine Translation; Description (pp. 1-3); Claims (p. 1).*

*Primary Examiner* — Eric A Gates
*Assistant Examiner* — Bayan Salone
(74) *Attorney, Agent, or Firm* — Coats & Bennett, P.L.L.C.

(57) ABSTRACT

A manually actuated robotic tool changer includes a rapid coupling mechanism. The tool changer includes a master unit having a piston moveable along its axis between an unlocked position and a fully locked position, and a tool unit that is coupled to the master unit when the units are adjacent and the piston is moved to the fully locked position. A piston movement control mechanism selectively allows free axial motion of the piston between the unlocked position and a nearly locked position, when the control mechanism is actuated. The piston may be biased toward the locked position, allowing the master and tool units to be rapidly coupled by positioning the units adjacently, actuating the control mechanism to allow the piston to rapidly advance to a nearly locked position, releasing the control mechanism to restrict free axial motion of the piston, and manually advancing the piston to a fully locked position.

12 Claims, 12 Drawing Sheets

(56) References Cited

U.S. PATENT DOCUMENTS

| | | | |
|---|---|---|---|
| 4,932,295 A * | 6/1990 | Erickson | 82/160 |
| 4,981,057 A * | 1/1991 | von Haas et al. | 82/160 |
| 5,054,344 A * | 10/1991 | Erickson et al. | 82/160 |
| 5,143,495 A * | 9/1992 | Bosek | 409/233 |
| 5,169,270 A * | 12/1992 | Erickson | 411/306 |
| 5,173,017 A * | 12/1992 | Oshnock et al. | 409/234 |
| 5,211,501 A * | 5/1993 | Nakamura et al. | 403/322.3 |
| 5,219,318 A * | 6/1993 | Vranish | 483/16 |
| 5,245,896 A * | 9/1993 | Erickson et al. | 82/160 |
| 5,415,066 A * | 5/1995 | Erickson et al. | 82/160 |
| 5,452,631 A * | 9/1995 | Erickson | 82/160 |
| 5,692,851 A * | 12/1997 | Pace | 403/31 |
| 5,697,740 A * | 12/1997 | Von Haas et al. | 409/234 |
| 5,845,898 A * | 12/1998 | Halder et al. | 269/48.1 |
| 5,870,935 A * | 2/1999 | Erickson et al. | 82/160 |
| 5,888,234 A * | 3/1999 | Littig | 623/38 |
| 6,000,306 A * | 12/1999 | Erickson | 82/160 |
| 6,106,559 A * | 8/2000 | Meyer | 623/33 |
| 6,116,966 A * | 9/2000 | Little et al. | 439/700 |
| 6,196,094 B1 * | 3/2001 | Erickson | 82/158 |
| 6,386,789 B1 * | 5/2002 | Chausse et al. | 403/322.2 |
| 6,440,173 B1 * | 8/2002 | Meyer | 623/36 |
| 6,569,070 B1 * | 5/2003 | Harrington et al. | 483/1 |
| 6,596,027 B2 * | 7/2003 | Laghi | 623/33 |
| 6,596,028 B1 * | 7/2003 | Laghi | 623/33 |
| 6,605,118 B2 * | 8/2003 | Capper et al. | 623/36 |
| 6,623,015 B2 * | 9/2003 | Schill et al. | 279/71 |
| 6,626,951 B1 * | 9/2003 | Gramnas | 623/33 |
| 6,792,836 B1 * | 9/2004 | Wang | 81/177.85 |
| 6,823,762 B2 * | 11/2004 | Hu | 81/177.85 |
| 6,884,013 B2 * | 4/2005 | Kiviranta et al. | 411/348 |
| 7,073,423 B2 * | 7/2006 | Aquino et al. | 83/582 |
| 7,108,722 B2 * | 9/2006 | Wagman | 623/38 |
| 7,217,060 B2 * | 5/2007 | Ingimarsson | 403/325 |
| 7,252,453 B1 * | 8/2007 | Little | 403/322.2 |
| 7,887,248 B2 * | 2/2011 | Heath | 403/345 |
| 7,891,903 B2 * | 2/2011 | Klingenberg et al. | 403/322.2 |
| 8,005,570 B2 * | 8/2011 | Gloden et al. | 700/245 |
| 8,087,845 B2 * | 1/2012 | Lin et al. | 403/350 |
| 8,122,623 B1 * | 2/2012 | Hughes | 37/457 |
| 8,162,581 B2 * | 4/2012 | Soltis et al. | 411/348 |
| 2004/0030410 A1 * | 2/2004 | Wagman | 623/27 |
| 2007/0228670 A1 * | 10/2007 | Norton et al. | 279/2.11 |
| 2007/0228671 A1 * | 10/2007 | Norton | 279/2.11 |
| 2007/0235949 A1 * | 10/2007 | Gloden et al. | 279/2.12 |
| 2009/0322041 A1 * | 12/2009 | Norton | 279/2.11 |
| 2010/0059943 A1 * | 3/2010 | Norton et al. | 279/72 |
| 2010/0062919 A1 * | 3/2010 | Norton et al. | 483/55 |

* cited by examiner

United States Patent US 8,533,930 B2

MANUAL ROBOTIC TOOL CHANGER HAVING RAPID COUPLING MECHANISM

The present application is a continuation-in-part of U.S. patent application Ser. No. 12/205,216, titled Manual Robotic Tool Changer with Rolling Members, filed Sep. 5, 2008, and claims priority to that application.

FIELD OF THE INVENTION

The present invention relates generally to robotics, and in particular to a manually actuated robotic tool changer having a rapid coupling mechanism.

BACKGROUND

Robots are widely utilized in industrial assembly line and other manufacturing applications to perform repetitive tasks very precisely without the need for human operation, interaction, or supervision. For example, robots are commonly used in the automotive industry to perform a number of tasks such as material handling, cutting, welding, and the like.

To amortize the considerable cost of an industrial robot over a variety of tasks, the robot arm is typically separate from a diverse array of robotic tools, which are removably attached to the end of the robot arm. To facilitate this plurality of tools, a tool changer—comprising "master" and "tool" units—may be interposed between a robot arm and each tool that may be attached to it. The robot arm typically terminates in a master unit. A corresponding tool unit is connected to each tool that may be attached to the robot arm. A mechanical coupling mechanism in the tool changer positively locks the master and tool units together for the duration of the use of the tool on the robot arm, and releases the tool from the robot arm upon completion of the tool's tasks. In a production manufacturing environment, robotic tool changers may be power actuated, such as by electric motor, pneumatic pressure, or the like, and software controlled. The robot arm control software then swaps out tools as necessary, reducing down time.

However, in many applications, such as where robotic tasks change only infrequently, or where tools are changed only in the event of a tool failure, or where there is no way to provide air or power for tool changer operation, a manually actuated tool changer may be simpler, more reliable, and less expensive than an automated one. A manual tool changer should be simple to operate, and capable of being changed rapidly and with a minimum of manual effort.

SUMMARY

A manually actuated robotic tool changer includes a rapid coupling mechanism. The tool changer includes a master unit having a piston moveable along its axis between an unlocked position and a fully locked position, and a tool unit that is coupled to the master unit when the units are adjacent and the piston is moved to the fully locked position. A piston movement control mechanism selectively allows free axial motion of the piston between the unlocked position and a nearly locked position, when the control mechanism is actuated. The piston may be biased toward the locked position, allowing the master and tool units to be rapidly coupled by placing the units adjacent each other, actuating the control mechanism to allow the piston to rapidly advance to a nearly locked position, releasing the control mechanism to restrict free axial motion of the piston, and manually advancing the piston from the nearly locked position to a fully locked position. In the fully locked position, a multi-faceted cam surface on the piston displaces rolling members in the master unit, causing them to press against a ledge in the tool unit, coupling the master and tool units together.

One embodiment relates to a manually actuated robotic tool changer. The tool changer includes a first unit adapted to be connected to one of a robotic arm or a robotic tool and a second unit adapted to be connected to the other of the robotic arm or the robotic tool. A plurality of rolling members is retained in one of the units. A piston is mounted in one of the units, the piston moveable along its axis between unlocked and locked positions, the piston having a multi-faceted cam surface. A piston movement control mechanism is operative to selectively allow free axial movement of the piston by manual actuation of the piston movement control mechanism. When the piston is in the locked position, the cam surface is operative to contact the rolling members in one of the units and to urge each rolling member against a surface of the other unit to couple the two units together.

Another embodiment relates to a method of coupling a tool having one of a master unit or tool unit of a robotic tool coupler affixed thereto, to a robot having the other of the master or tool unit affixed thereto. The master unit has a piston moveable along its axis between an unlocked position defining a decoupled state, and a fully locked position defining a coupled state. One or both of the robot and the tool are positioned so as to position the tool unit adjacent the master unit when the master unit is in the decoupled state. A piston movement control mechanism is actuated so as to allow the piston to freely move from the unlocked position to a nearly locked position. The piston movement control mechanism is de-actuated so as to prevent free axial movement of the piston. The piston is manually progressed from the nearly locked position to the fully locked position so as to place the master unit in the coupled state wherein it is mechanically coupled to the tool unit.

DETAILED DESCRIPTION

Figure 1:
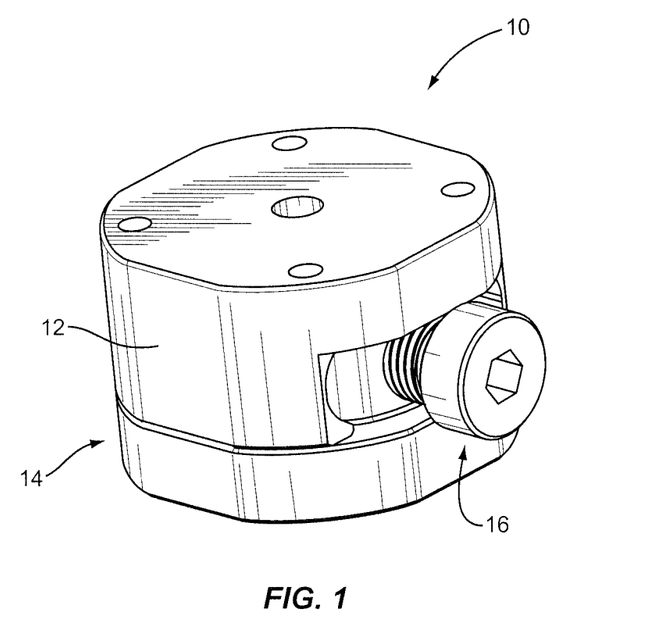
FIG. 1 is a perspective view of a manually actuated robotic tool changer.

FIG. 1 depicts a manually actuated robotic tool changer 10 in a coupled state. The tool changer 10 comprises a tool unit 12 adapted to be connected to a robotic tool, and a master unit 14 adapted to be connected to a robotic arm. A piston 16 is movably mounted within the master unit 14, and depicted in FIG. 1 in a locked position.

Figure 2:
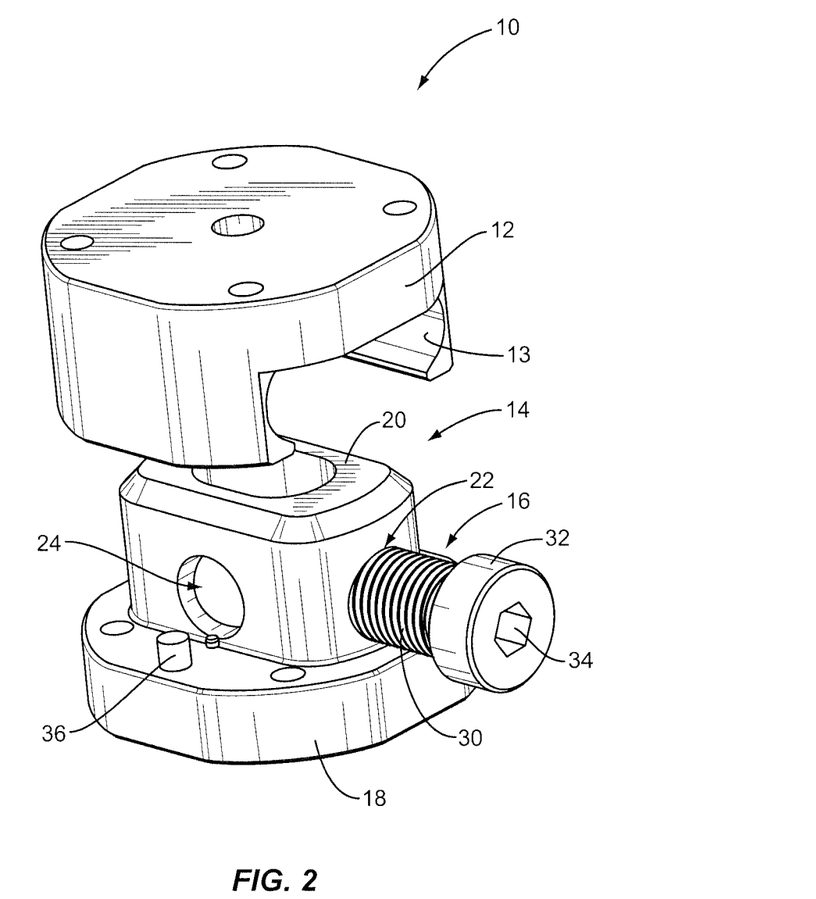
FIG. 2 is a perspective view of the master and tool units that make up the manually actuated robotic tool changer.

FIG. 2 depicts the robotic tool changer 10 in a decoupled state, with the piston 16 in an unlocked position and the tool unit 12 separated from the master unit 14. The master unit 14 comprises a base plate 18 and a housing 20 connected to the base plate 18. The piston 16 is mounted in the housing 20 via a threaded shaft 30 that mates with a correspondingly tapped bore 22. By rotating the piston 16 about its axis—either by hand, gripping the head 32, or by use of a tool such as a hex wrench inserted into opening 34—the piston 16 moves linearly along its axis with respect to the housing 20 by action of the threads 30 and tapped bore 22. The housing 20 additionally includes one or more openings 24, through which rolling members (not depicted in FIG. 2) partially protrude when the piston 16 is in a locked position, to couple the tool unit 12 to the master unit 14. This coupling occurs as the rolling members are pressed against a ledge 13 in the tool unit 12. One or more alignment members 36 on the base plate 18 are received by corresponding alignment member voids (not depicted in FIG. 2) in the tool unit 12, to ensure alignment between the master and tool units 14, 12.

Figure 3:
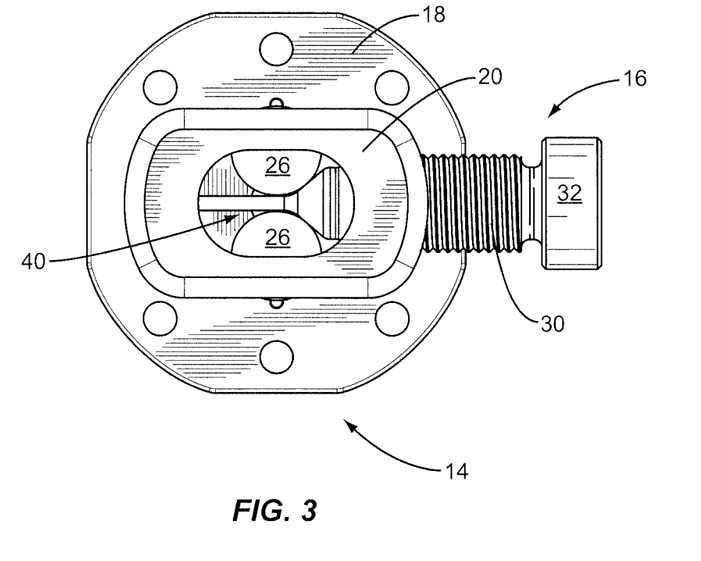
FIG. 3 is a plan view of the master unit of the manually actuated robotic tool changer, with the piston in the unlocked position.

FIG. 3 depicts the master unit 14 with the piston 16 in an unlocked position, and rolling members 26—in this embodiment, spheres—retracted into the housing 20. In other embodiments, the rolling members 26 may comprise cylinders or other shapes capable of rolling. In the unlocked position, the tool unit 12 may freely move onto or off of the master unit 14.

Figure 4:
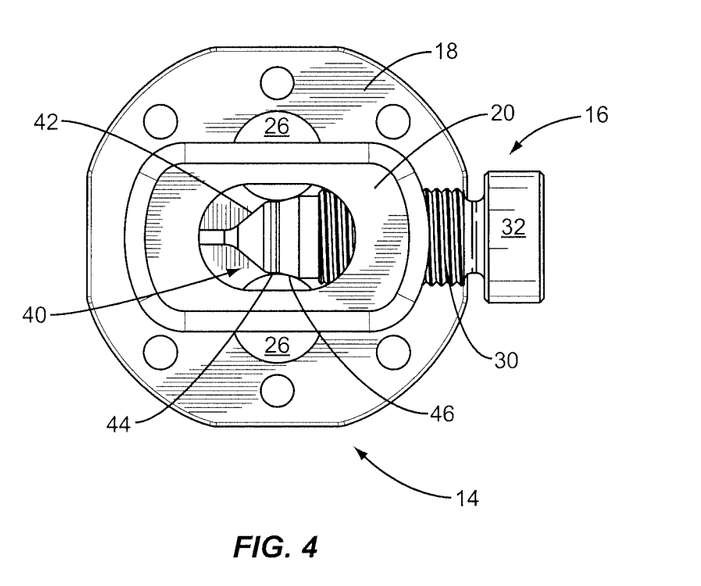
FIG. 4 is a plan view of the master unit of the manually actuated robotic tool changer, with the piston in the locked position.

FIG. 4 depicts the master unit 14 with the piston 16 in a locked position, and rolling members 26 partially protruding from the openings 24 in the sides of the housing 20. The rolling members 26 are urged outwardly through the openings 24 by a multi-faceted cam surface 40 as the piston 16 advances from an unlocked to a locked position (to the left, as depicted in FIGS. 3 and 4). The openings 24, at the least the outermost surface thereof, are preferably sized slightly less than the diameter of the rolling members 26, so as to retain the rolling members 26 within the housing 20. In one embodiment, the openings 24 are concave, matching the curvature of the rolling members 24. As each rolling member 24 advances outwardly of the housing 20, it contacts, and is pressed against, a ledge 13 in the tool unit 12 (best seen in FIG. 2), which couples the tool unit 12 to the master unit 14.

Figure 5:
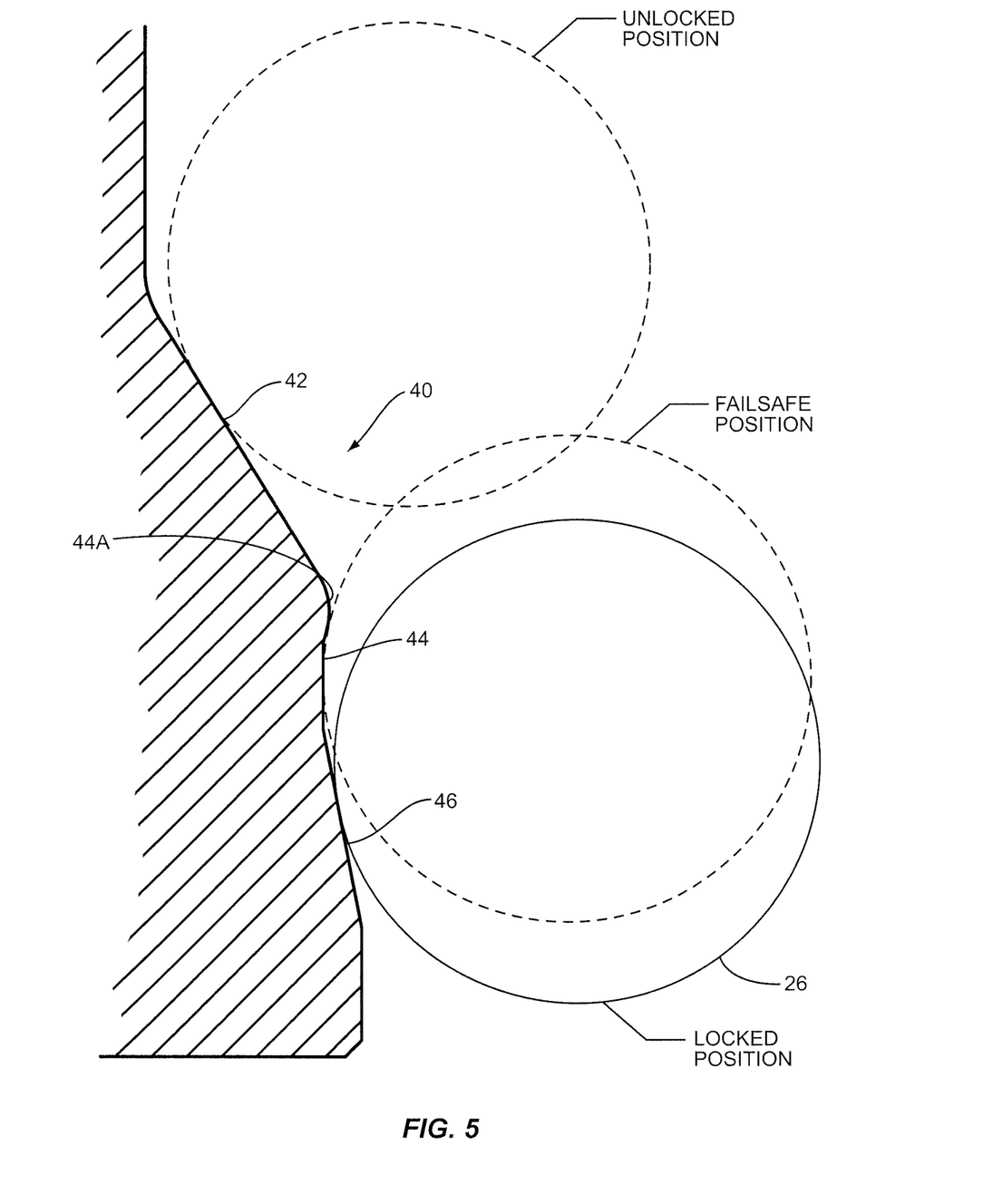
FIG. 5 is an enlarged section view of a multi-faceted cam surface.

FIG. 5 depicts details of the multi-faceted cam surface 40, and its interaction with the rolling members 26. As the piston 16 moves from the unlocked position (see FIG. 3) toward the locked position (see FIG. 4), an initial contact surface 42 contacts the rolling members 26. The initial contact surface 42 is conical, or inclined with respect to the axis of the piston 16, in a direction that urges the rolling members 26 radially outward (and out of the housing 20) as the piston 16 advances toward the locked position. At the other end of the multi-faceted cam surface 40, a locking surface 46 presses the rolling members 26 firmly against the ledge 13 in the tool unit 12 to couple the tool unit 12 to the master unit 14, when the piston is in the locked position. The locking surface 46 is conical, and is inclined in the same direction, with respect to the axis of the piston 16, as the initial contact surface 42, although it may have a different angle of inclination. Note that although, for ease of explanation, FIG. 5 appears to depict one cam surface 40 and three different rolling member 26 positions, in fact the rolling members 26 are fixed against movement in the axial direction of the piston. FIG. 5 thus actually depicts relative positions of the cam surface 40 (and the radial position of the rolling members 26) as the piston 16 moves between various positions.

Interposed between the initial contact surface 42 and the locking surface 46 is a failsafe surface 44. Accordingly, when the piston is positioned such that the rolling members 26 contact the failsafe surface, it is said to be a failsafe position. The failsafe position of the piston 16 is in between the locked and unlocked positions, and, as explained below, is very close to the locked position. The failsafe surface 44 is not inclined with respect to the axis of the piston 16 in the same direction as the initial contact surface 42 and the locking surface 46. In one embodiment, the failsafe surface 44 is cylindrical about the axis of the piston 16. That is, the failsafe surface 44 is parallel to the axis, and not inclined with respect to the axis in either direction. The purpose of the failsafe surface 44 is to prevent inadvertent decoupling of the tool changer 10.

When the piston 16 is in the locked position, the locking surface 46 exerts a radial, outward force on each rolling member 26, which may be represented by a force vector normal to the locking surface 46. Conversely, each rolling member 26 exerts an inwardly-directed radial force on the piston 16, also in a direction normal to the locking surface 46. Because the locking surface 46 is inclined with respect to the axis of the piston 16, a component of this inward radial force acts along the axis of the piston 16, urging the piston 16 toward the unlocked position (i.e., down, as depicted in FIG. 5). If the piston 16 is not fixed in the locked position, movement and vibration of the tool changer 10 may allow this force component to cause the piston 16 to rotate, and move towards the unlocked position. This would reduce the force with which the rolling members 26 are urged against the ledge 13 in the tool unit 12, introducing undesirable "play," or relative movement between the tool unit 12 and the master unit 14. Ultimately, the force may urge the piston 16 so far toward the unlocked position as to allow the tool unit 12 to separate from the master unit 14—an unacceptable safety hazard.

The failsafe surface 44, interposed between the locking surface 46 and the initial contact surface 42, is not inclined with respect to the axis of the piston 16 in the same direction as the other two surfaces. In one embodiment, the failsafe surface 44 is cylindrical, or parallel to the axis of the piston 16. As in the piston 16 moves to the failsafe position, the rolling members 26 contact the failsafe surface 44 rather than the locked surface 46. In this position, the force exerted by each rolling member 26 against the piston 16 is normal to the failsafe surface 44. Since the failsafe surface 44 is parallel to the axis of the piston 16, the inward radial force cannot urge the piston 16 in either direction along its axis. Accordingly, the tool unit 12 will remain coupled to the master unit 14 until the piston is manually actuated to the unlocked position.

In one embodiment, the failsafe surface 44 includes a ridge, or retarding surface 44A, disposed opposite the locking surface 46—that is, adjacent the initial contact surface 42. The retarding surface 44A further secures the piston 16 in the failsafe position. To clear the retarding surface 44A, the rolling members 26 must move slightly outwardly, requiring a positive actuation of the piston 16 to move it further toward the unlocked position. In one embodiment (not depicted in the drawings), the failsafe surface 44 may comprise a conical surface, slightly inclined with respect to the axis of the piston 16, but in a direction opposite to the inclination of the initial contact surface 42 and locking surface 46. In all of these embodiments, the failsafe surface 44 is preferably disposed adjacent a relatively short locking surface 46, as compared to the initial contact surface 42—in other words, the failsafe position of the piston 16 is preferably close to the locked position—so that rolling members 26 retract only slightly within the housing 20 from their place in the locked position.

Figure 6:
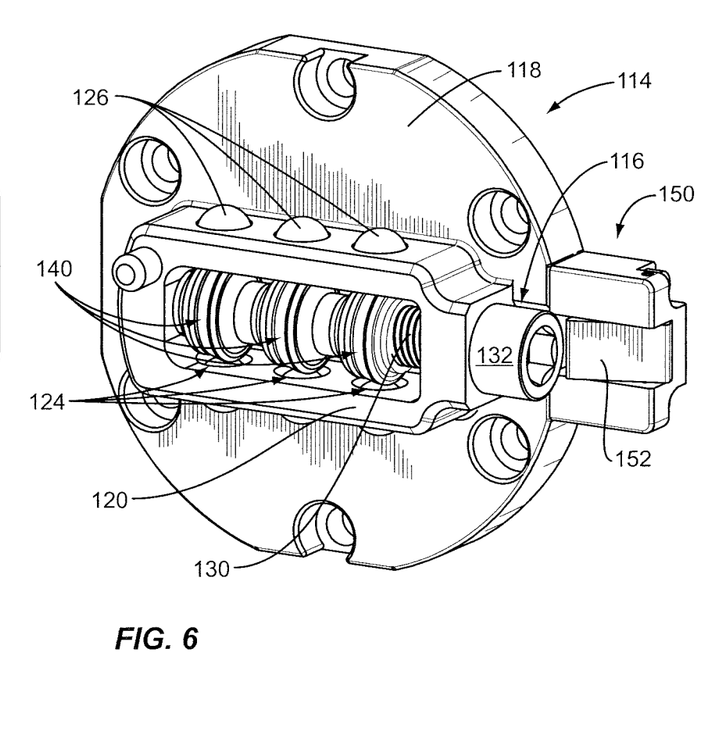
FIG. 6 is a perspective view of the master and tool units of a manually actuated robotic tool changer having plural rolling members and a piston with plural cam surfaces.

The manually actuated tool changer of the present invention is scalable. FIG. 6 depicts an embodiment of the tool changer 100 for coupling a robot arm to a larger and/or heavier robotic tool then the tool changer 10 of FIGS. 1-4. The tool changer 100 comprises a tool unit 112 and a master unit 114. The master unit 114 includes a base plate 118, and a housing 120. A piston 116 is movably mounted within the housing 120, and movable in an axial direction via threads 130. A plurality (three, in the embodiment depicted) of multi-faceted cam surfaces 140 on the piston 116 engage with a corresponding plurality of rolling members 126. The rolling members 126 are forced to extend partially out of the housing 120 through corresponding openings 124, as the piston 116 moves from an unlocked position to the locked position depicted in FIG. 6. In the locked position, the rolling members 126 engage and press against ledges 113, locking the tool unit 112 to the master unit 114. Each of the multi-faceted cam surfaces 140 comprises an initial contact surface 142, a failsafe surface 144, and a locking surface 146, as discussed above with reference to FIG. 5.

The tool changer 100 of FIG. 6 further includes a locking mechanism 150 to prevent the piston 116 from inadvertently "backing out" from the locked position. A spring-loaded latch 152 is depressed into the housing of the locking mechanism 150 as the piston 116 advances from an unlocked position to the locked position. With the piston 116 in the locked position, the latch 152 is released, and raises adjacent the head 132. In this position, the latch 152 blocks the piston 116 from further movement towards the unlocked position (i.e., to the right, as depicted in FIG. 6).

Service transfer modules (not shown) may be attached to the tool units 12, 112 and master units 14, 114, such that the service transfer modules mate when the master and tool units 14, 114, 12, 112 are coupled together, to provide for the transfer of utilities such as electricity, data signals, pneumatics, fluid, and the like. Although not depicted in the drawings, the master and tool units 14, 114, 12, 112 may alternatively or additionally include service transfer facilities within their respective housings. For example, U.S. Pat. No. 5,211,501 to Nakamura, et al., incorporated herein by reference, depicts a robotic tool coupler having an integral pneumatic fluid transfer facility.

Figure 7:
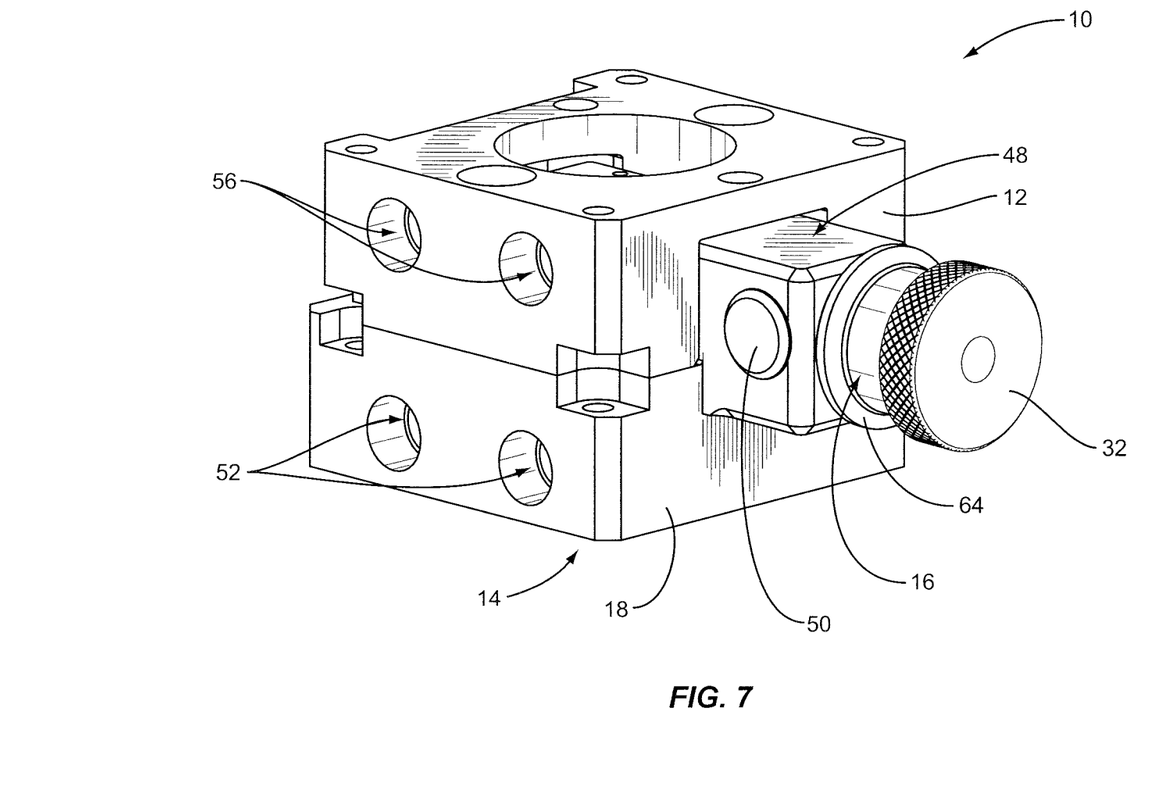
FIG. 7 is a perspective view of a manually actuated robotic tool changer having a rapid coupling mechanism.

In one embodiment, a manually actuated tool changer 10 includes a piston movement control mechanism to assist a user in rapidly and easily coupling the tool unit 12 and master unit 14 together, by selectively providing for free axial movement of the piston 16. FIG. 7 depicts a tool changer 10 wherein the housing 20 of the master unit 14 includes an extended portion 48. Disposed within a bore in the extended portion 48, and moveable within the bore, is an actuating button 50. As described herein, in one embodiment, the piston 16 is mechanically biased towards the locked position. Pressing the actuating button 50 allows free axial movement of the piston 16, allowing it to advance rapidly towards the locked position under this bias. The tool changer 10 is then fully coupled by releasing the actuating button 50 and manually turning the knob 32, advancing the piston 16 to the fully locked position.

Figure 8:
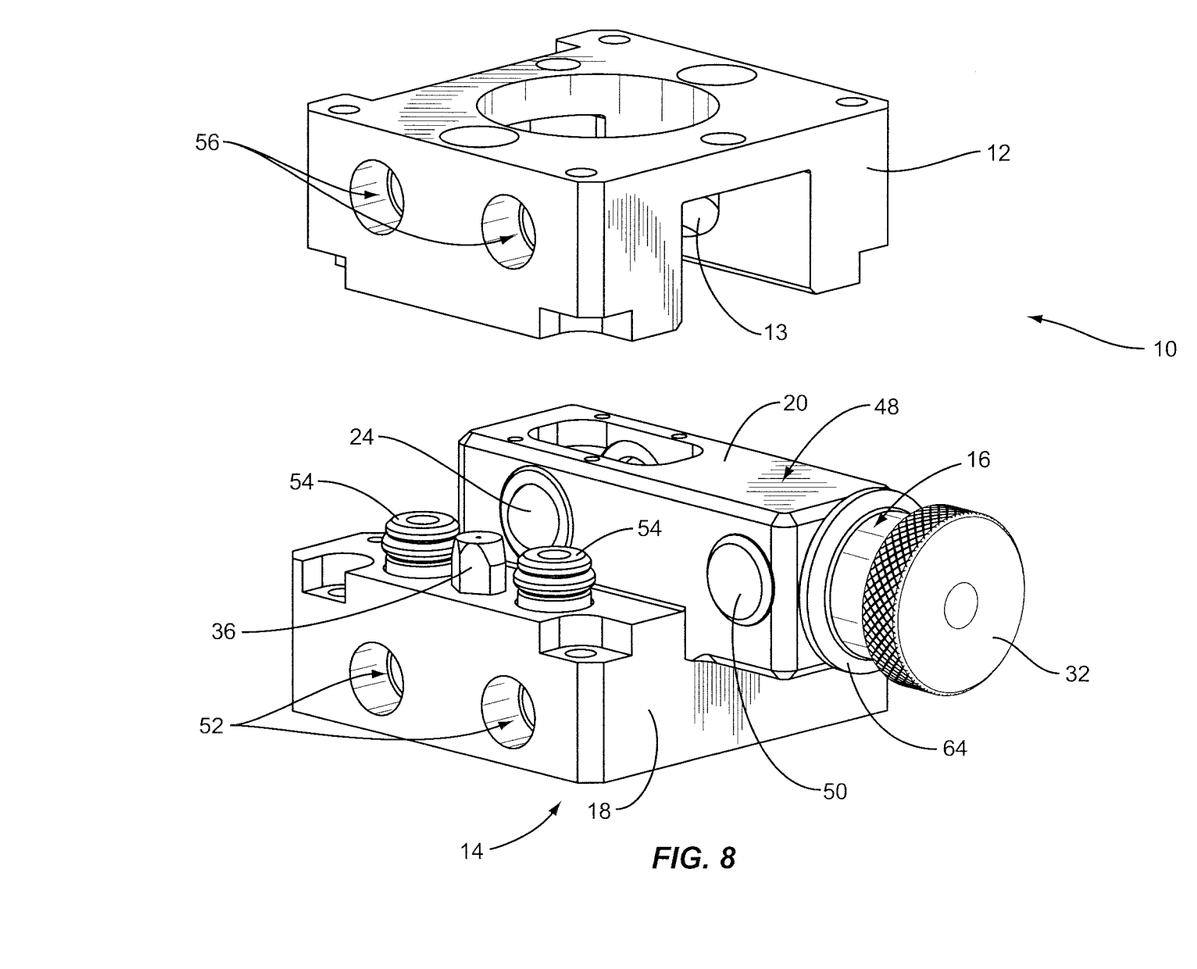
FIG. 8 is a perspective view of the master and tool units that make up the robotic tool changer of FIG. 7.

FIG. 8 depicts the tool changer 10 with the tool unit 12 decoupled from the master unit 14. In this embodiment, utility ports 52, 56 and utility couplers 54 facilitate passing, e.g., pneumatic fluid between the master unit 14 and tool unit 12. In particular, utility ports 52 in the master unit 14 housing 18, and utility ports 56 in the tool unit 12, are each configured to be connected to a source or sink of pneumatic fluid. The pneumatic fluid is passed between the master unit 14 and tool unit 12, when the units are coupled, via self-sealing couplers 54. The pneumatic fluid utility is representative only. In other embodiments, the master unit 14 and tool unit 12 may be provisioned with facilities to pass electrical current, electrical or optical data signals, or other utilities.

Figure 9:
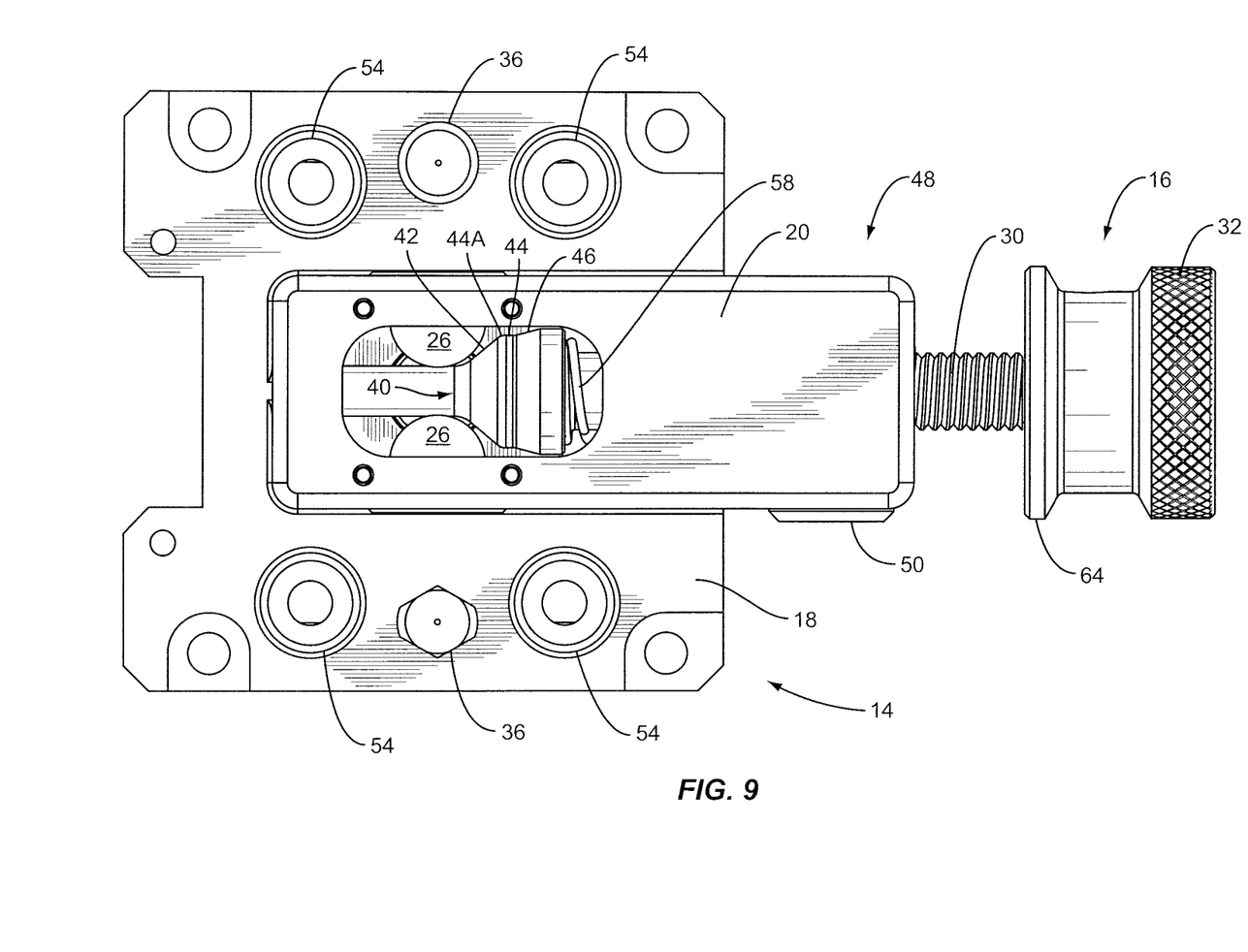
FIG. 9 is a plan view of the master unit of the robotic tool changer of FIG. 7, in a decoupled position.
Figure 12A:
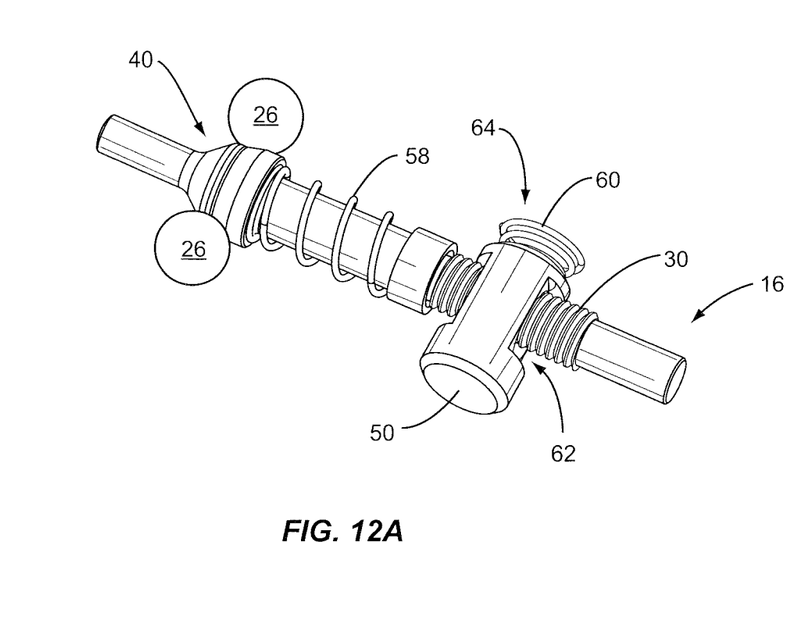
FIGS. 12A and 12B are partially exploded perspective views of portions of the master unit of the robotic tool changer of FIG. 7.
Figure 12B:
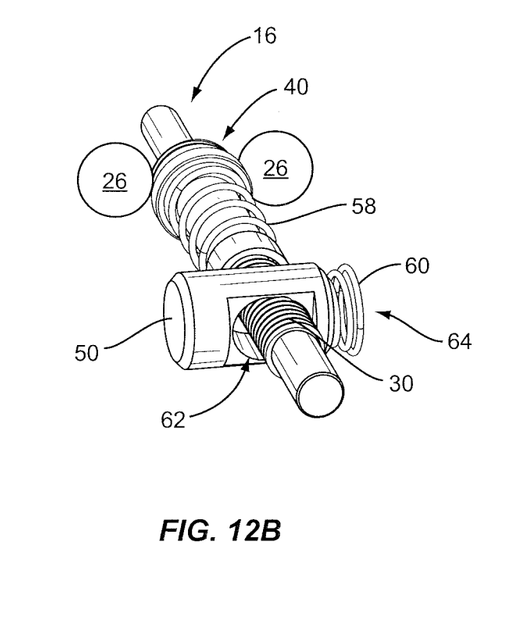
Figure 13:
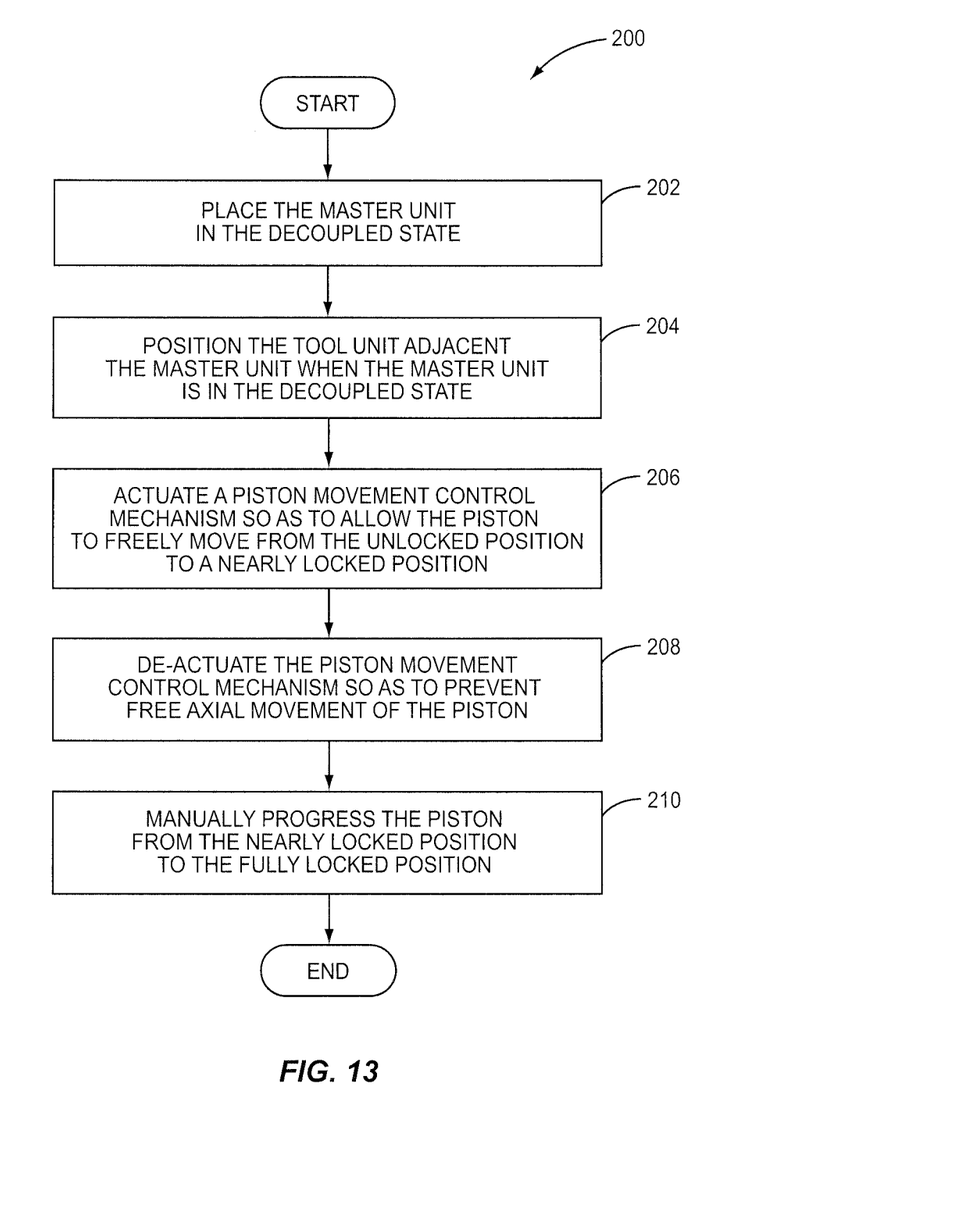
FIG. 13 is a flow diagram of a method of coupling a tool to a robot.

FIG. 13 depicts a method 200 of coupling a tool to a robot, where a tool unit 12 is affixed to the tool and a master unit 14 is affixed to the robot. The master unit 14 is first placed in a decoupled state (block 202). FIG. 9 depicts the master unit 14 of the tool changer 10 in the decoupled state, with the piston 16 in the unlocked position and the rolling members 26 within the housing 20. The threads 30 on at least a portion of the piston 16 selectively engage a corresponding tapped surface (not shown) associated with the actuating button 50 disposed within the extended portion 48 of the housing 20. The actuating button 50 is biased to a non-actuated position (downwardly, as depicted in FIG. 9), such as by a spring 60 (see FIG. 12). The tapped surface engages the threads 30 when the actuating button 50 is in the non-actuated position (that is, by default), and disengages the threads 30 when the actuating button 50 is depressed.

One or both of the robot and the tool are then moved, to place the master unit 14 and tool unit 12 adjacent, as depicted in FIG. 7 (FIG. 13, block 204). The actuating button 50 is then pressed, or actuated, to disengage the tapped surface and the threads 30, allowing the piston 16 to move freely in the piston's axial direction (FIG. 13, block 206). A spring 58 is disposed around the piston 16 between the interior of the extended portion 48 of the housing 20 and the cam surface 40. The spring 58 biases the piston 16 toward the locked position (to the left, as viewed in FIG. 9). Thus, when the actuating button 50 is then pressed, the piston 16 advances under the bias of spring 58 to a nearly locked position.

Figure 10:
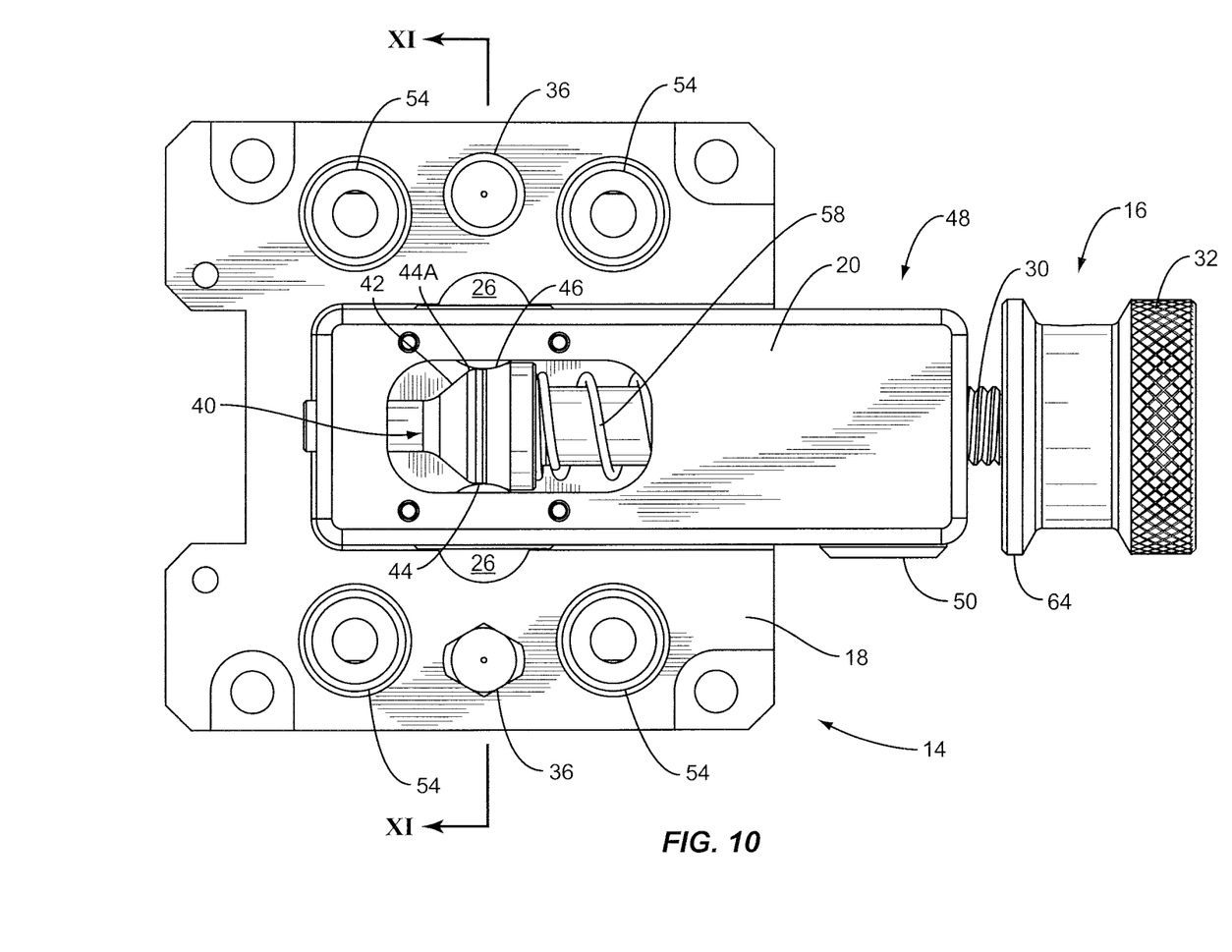
FIG. 10 is a plan view of the master unit of the robotic tool changer of FIG. 7, in a nearly fully coupled position.

FIG. 10 depicts the master unit 14 of the tool changer 10 in a nearly fully coupled state, with the piston 16 near the fully locked position and the rolling members 26 forced out of the housing 20 by engagement with the multi-faceted cam surface 40, as described above. This is the position of the piston 16 after pressing the actuating button 50.

As the piston 16 moves toward this position, the initial contact surface 42 engages the rolling members 26 and urges them outwardly. As described above with reference to FIG. 5, as the piston 16 moves further toward the locked position, the failsafe surface 44, and then the locking surface 46, contacts the rolling members 26. In the nearly-locked position depicted in FIG. 10, the locking surface 46 urges the rolling members 26 outwardly, and against corresponding ledges in the tool unit 12 (see FIG. 11).

When the actuating button 50 is released, or de-actuated, the tapped surface again engages with the threads 30 of the piston 16, preventing free axial movement of the piston 16. (FIG. 13, block 208). The piston 16 is then advanced to the fully locked position by turning the knob 32 (FIG. 13, block 210). In one embodiment, the knob 32 is tightened approximately a half turn to advance the piston 16 to the fully locked position. This more completely presses the rolling members 26, by the locking surface 46, against the ledge 13 of the tool unit 12.

Figure 11:
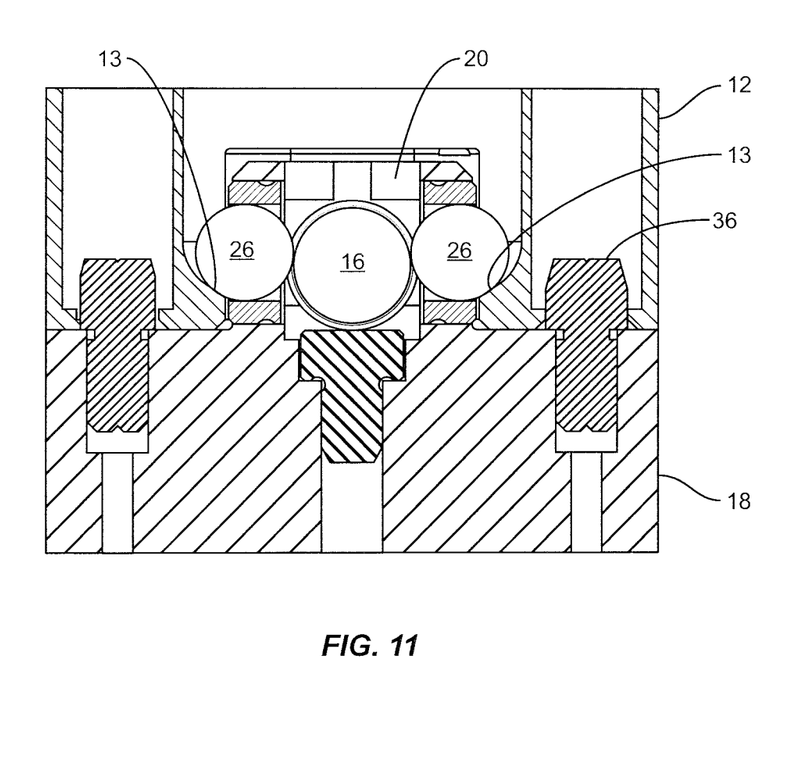
FIG. 11 is a sectional view of the robotic tool changer of FIG. 7.

FIG. 11 is a sectional view along the line depicted in FIG. 10. FIG. 11 depicts the rolling members 26 being fully displaced from the housing 20 of the tool unit 14, and engaging the ledges 13 in the tool unit 12. Each rolling members 26 exerts a force on a corresponding ledge 13 urging the tool unit 12 towards the master unit 14 (downwardly, as depicted in FIG. 11), coupling the master and tool units 14, 12 together.

FIGS. 12A and 12B are partial exploded perspective views depicting the piston 16, one multi-faceted cam surface 40, and associated rolling members 26, the piston bias spring 58, and the piston movement control mechanism 64. The piston movement control mechanism 64 includes the actuating button 50, having an elongate bore 62 with at least part of its inner surface being tapped, and the actuating button bias spring 60. The piston 16 extends through the elongate bore 62 in the actuating button 50, which is greater in a longitudinal direction (along the actuating axis of the button 50) than the diameter of the piston 16. A tapped surface is formed in least the inner surface of the elongate bore 62 proximate the actuating button bias spring 60.

The longitudinal dimension of the elongate bore 62 is sufficient to allow the piston 16 to pass freely through the bore 62—that is, without the threads 30 engaging the tapped surface—when the actuating button 50 is pressed and moved in a direction to compress the actuating button bias spring 60 (i.e., to the right as depicted in FIG. 12B). This allows the piston 16 to rapidly advance to a nearly locked position, such as under the bias of the spring 58. Of course, the piston bias spring 58 is not necessary, as the piston may be rapidly advanced, while the actuating button 50 is depressed, simply by pushing it towards the locked position.

Once the actuating button 50 is released, it moves under the bias of the spring 60, again engaging the tapped surface within the elongate bore 62 with the threads 30 formed in the piston 16. The piston 16 may then be moved to the fully locked position by a relatively limited turning of the piston 16.

The tool changer 10 may be decoupled by manually turning the piston 16 so as to move the piston 16 away from the fully coupled position. In some embodiments, the actuating button 50 may be depressed and the piston pulled to the unlocked position. However, in embodiments where the piston bias spring 58 exerts a considerable force towards the locked position, the piston 16 is moved to the unlocked position by turning the knob 32. The threads 30, engaged with the tapped surface in the button bore 62, move the piston along its axis to the unlocked position (again compressing the piston bias spring 58).

Those of skill in the art will recognize that the threads 30 and tapped inner surface of the elongate bore 62 are only one means of selectively enabling and restricting the free axial movement of the piston 16. For example, in one embodiment, the piston 16 may have teeth formed on at least one side, with a corresponding gear disposed in the elongate bore 62 to selectively engage and disengage the teeth, depending on the position of the actuating button 50. In one embodiment, the gear may be driven with a ratcheting mechanism to manually move the piston 16. Operation would be similar to that described above with respect to the threaded embodiment. Other implementation details may be readily devised by those of skill in the art for particular applications, given the teachings of the present disclosure.

In the embodiment depicted in FIGS. 7-10, a flange 64 is formed in the piston 16 end, near the knob 32. The flange 64 is sized to fully cover the button bore 62, and its position on the piston 16 is selected such that the flange 64 is flush or nearly flush with the protruding end 48 of the housing 20 when the piston 16 is in the fully locked position (see FIG. 7). This prevents the intrusion of dust or debris into the interior of the housing 20, when a tool is coupled to a robot and is in use.

Those of skill in the art will readily appreciate that the automatic actuation of the piston 16 to a nearly fully coupled position may be applied to the embodiment of FIG. 6, wherein multiple multi-faceted cam surfaces 140 and corresponding rolling members 126 are deployed on a single piston 116. Furthermore, the piston locking mechanism 150 depicted in FIG. 6 may readily be applied to the embodiments depicted in FIGS. 7-12.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A manually actuated robotic tool changer, comprising:
    a first unit adapted to be connected to one of a robotic arm or a robotic tool;
    a second unit adapted to be connected to the other of the robotic arm or the robotic tool;
    a plurality of rolling members retained in one of the units;
    a piston mounted in one of the units, the piston moveable along its axis between unlocked and locked positions, the piston having a multi-faceted cam surface; and
    a piston movement control mechanism operative to selectively allow free axial movement of the piston toward the locked position by manual actuation of the piston movement control mechanism, and to allow only controlled axial movement of the piston to the locked position when the piston control mechanism is not actuated;
    wherein, when the piston is in the locked position, the cam surface is operative to contact the rolling members in one of the units and to urge each rolling member against a surface of the other unit to couple the two units together.

2. The tool changer of claim 1 wherein the piston movement control mechanism is further operative to restrict free axial movement of the piston when the piston movement control mechanism is not actuated.

3. The tool changer of claim 1 wherein at least a portion of the piston is threaded, and wherein the piston movement control mechanism comprises:
    an actuating button moveable along a button axis generally perpendicular to the piston axis;
    an elongate bore formed in the actuating button, the piston being disposed through the elongate bore, and the bore having a dimension in the button axial direction greater than the diameter of the piston;
    a tapped surface on the interior of at least one side of the elongate bore, the tapped surface operative to engage threads on the threaded portion of the piston; and
    a button biasing mechanism operative to bias the actuating button to a non-actuated position in which the tapped surface engages the piston threads so as to restrict free axial movement of the piston.

4. The tool changer of claim 3 wherein the button biasing mechanism comprises a spring.

5. The tool changer of claim 3 further comprising a flange on the piston operative to cover the elongate bore when the piston is in the locked position.

6. The tool changer of claim 1 further comprising a piston biasing mechanism operative to bias the piston toward the locked position.

7. The tool changer of claim 6 wherein the piston biasing mechanism comprises a spring.

8. The tool changer of claim 1 wherein the piston comprises a first plurality of multi-faceted cam surfaces, each operative to urge a second plurality of rolling members against a surface to couple the first and second units together.

9. The tool changer of claim 1 further comprising a locking mechanism operative to maintain the piston in the locked position.

10. The tool changer of claim 9 wherein the locking mechanism includes a spring-loaded latch operative to physically block the piston from movement towards the unlocked position.

11. A method of coupling a tool having one of a master unit or tool unit of a robotic tool coupler affixed thereto, to a robot having the other of the master or tool unit affixed thereto, the master unit having a piston moveable along its axis between an unlocked position defining a decoupled state, and a fully locked position defining a coupled state, comprising:

positioning one or both of the robot and the tool so as to position the tool unit adjacent the master unit when the master unit is in the decoupled state;

actuating a piston movement control mechanism so as to allow the piston to freely move from the unlocked position to a nearly locked position;

de-actuating the piston movement control mechanism so as to prevent free axial movement of the piston; and manually progressing the piston from the nearly locked position to the fully locked position with the piston movement control mechanism de-actuated, so as to place the master unit in the coupled state wherein it is mechanically coupled to the tool unit.

12. The method of claim 11 further comprising, prior to positioning the robot or the tool, moving the piston to the unlocked position so as to place the master unit in the decoupled state.

\* \* \* \* \*